(12) United States Patent
Ribarov et al.

(10) Patent No.: US 8,973,866 B2
(45) Date of Patent: Mar. 10, 2015

(54) TRANSVERSE FLUX MACHINE UTILIZED AS PART OF A COMBINED LANDING GEAR SYSTEM

(75) Inventors: Lubomir A. Ribarov, West Hartford, CT (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 421 days.

(21) Appl. No.: 13/442,905

(22) Filed: Apr. 10, 2012

(65) Prior Publication Data

US 2013/0264415 A1 Oct. 10, 2013

(51) Int. Cl.
*B64C 25/36* (2006.01)

(52) U.S. Cl.
USPC ........................................ 244/50; 244/103 R

(58) Field of Classification Search
USPC ........... 244/50, 51, 60, 62, 100 R, 103 S, 111
See application file for complete search history.

(56) References Cited

U.S. PATENT DOCUMENTS

| | | | |
|---|---|---|---|
| 4,046,339 A | 9/1977 | Stancliffe | |
| 4,422,604 A | 12/1983 | Turiot et al. | |
| 4,681,284 A | 7/1987 | Veaux et al. | |
| 4,984,755 A | 1/1991 | Derrien | |
| 5,002,143 A | 3/1991 | Bernard et al. | |
| 5,362,015 A | 11/1994 | Derrien et al. | |
| 6,700,267 B2* | 3/2004 | Weiss | 310/112 |
| 6,732,979 B1 | 5/2004 | Kilner et al. | |
| 6,769,251 B2 | 8/2004 | Collet et al. | |
| 6,817,175 B2 | 11/2004 | Collet et al. | |
| 7,492,074 B1* | 2/2009 | Rittenhouse | 310/265 |
| 7,830,057 B2 | 11/2010 | Gieras | |
| 7,883,054 B2 | 2/2011 | Elliott et al. | |
| 8,070,094 B2 | 12/2011 | Collins | |
| 8,123,161 B1 | 2/2012 | Collins | |
| 2006/0038068 A1 | 2/2006 | Sullivan | |
| 2006/0192453 A1 | 8/2006 | Gieras et al. | |
| 2008/0142284 A1* | 6/2008 | Qu et al. | 180/65.6 |
| 2008/0179146 A1 | 7/2008 | Sullivan | |
| 2009/0040072 A1 | 2/2009 | Read et al. | |

(Continued)

FOREIGN PATENT DOCUMENTS

GB 2471213 B 5/2011
WO 2008048393 A2 4/2008

OTHER PUBLICATIONS

Caricchi, F., Crescimbini, F., and Santini, E., "Basic Principle and Design Criteria of Axial-Flux PM Machines Having Counterrotating Rotors," IEEE Trans. on Industry Applications, vol. 31, No. 5, pp. 10562-1068 (1995).

*Primary Examiner* — Rob Swiatek
*Assistant Examiner* — Michael Kreiner
(74) *Attorney, Agent, or Firm* — Carlson, Gaskey & Olds, PC

(57) ABSTRACT

A landing gear for an aircraft has a set of axially spaced wheels rotatable about a common axis drive by a transverse flux drive. In another feature, a transverse flux drive includes a first rotor and a second rotor. One of the first and second rotors is positioned radially inwardly of the other. A single stator is positioned radially intermediate the first and second rotors. In another feature, a landing gear combination for use on an aircraft has a nose wheel assembly including at least one nose wheel to be associated with a nose cone on an aircraft. A main landing gear assembly is also associated with the aircraft. A transverse flux motor provides on-ground propulsion and/or braking to the aircraft.

3 Claims, 2 Drawing Sheets

(56) References Cited

U.S. PATENT DOCUMENTS

| | | |
|---|---|---|
| 2009/0261197 A1 | 10/2009 | Cox et al. |
| 2010/0006699 A1 | 1/2010 | Sullivan |
| 2010/0236849 A1 | 9/2010 | Wishart |
| 2011/0062833 A1* | 3/2011 | Gieras et al. ................ 310/68 R |

* cited by examiner

TRANSVERSE FLUX MACHINE UTILIZED AS PART OF A COMBINED LANDING GEAR SYSTEM

BACKGROUND OF THE INVENTION

This application relates to a steering and drive arrangement which simplifies a landing gear assembly for an aircraft.

Aircraft are typically provided with a pair of nose wheel tires which are deployable from the underside of the frame as part of the landing gear. The nose wheel tires must steer the aircraft, and must also be retractable and deployable.

To provide steering the prior art has typically required some form of hydraulic steering mechanism, and associated valves, controls, etc. Further, a lubrication system has often been required for the steering system. A drive arrangement is also required.

In addition, aircraft are typically provided with main landing wheels under the wings or under the fuselage of the aircraft that typically do not turn. The main landing wheels provide braking force, and also may sometimes provide on-ground propulsion of the aircraft. As such, they have large drive apparatus. These large drive apparatus have to be communicated to the aircraft body, to supply hydraulic power, for example.

All of this has resulted in mechanical complexity, and has raised reliability and operational concerns.

Transverse flux machines are known, and provide any number of advantages with regard to efficient supply of torque. However, transverse flux machines have never been utilized in aircraft landing gear applications.

SUMMARY OF THE INVENTION

In a featured embodiment, a landing gear for an aircraft has a set of axially spaced wheels rotatable about a common axis. The wheels are mounted to pivot with a pivot connection such that the axially spaced wheels can be pivoted between an extended position and a stowed position. A drive arrangement drives the axially spaced wheels, and includes a transverse flux motor.

In another featured embodiment, a transverse flux drive is provided for a pair of spaced wheels. A first rotor is associated with a first of the pair of spaced wheels, and a second rotor is associated with a second of the spaced wheels. One of the first and second rotors is positioned radially inwardly of the other. The first and second rotors are rotatable about a common axis along with the first and second wheels. A single stator is positioned radially intermediate the first and second rotors, and is operable to drive the first and second rotors to rotate about the rotational axis with the single stator. The first and second rotors each provide transverse flux machines.

In another featured embodiment, a landing gear combination for use on an aircraft has a nose wheel assembly including at least one nose wheel to be associated with a nose cone on an aircraft. A main landing gear assembly is also provided. Each of the nose wheel and main landing gear assemblies are provided with a drive apparatus to provide on-ground propulsion to the aircraft. The drive apparatus for at least one of the main landing gear and nose wheels are operable to provide braking to the associated aircraft. At least one of the drive apparatus for the main landing gear assembly and nose wheel are provided by a transverse flux motor.

These and other features of the invention would be better understood from the following specifications and drawings, the following of which is a brief description.

DETAILED DESCRIPTION

Figure 1:
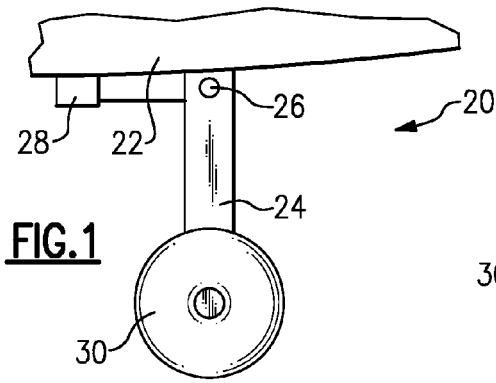
FIG. 1 schematically shows an aircraft nose wheel.

FIG. 1 shows an aircraft 20 including an aircraft body 22 having a deployable and retractable landing gear 24. A pivot point 26 is shown associated with an actuator 28, which schematically refers to the ability for the landing gear 24 to be pulled to a stowed position within the vehicle body 22, or extended to the illustrated landing position. A nose wheel 30 is shown.

Figure 2:
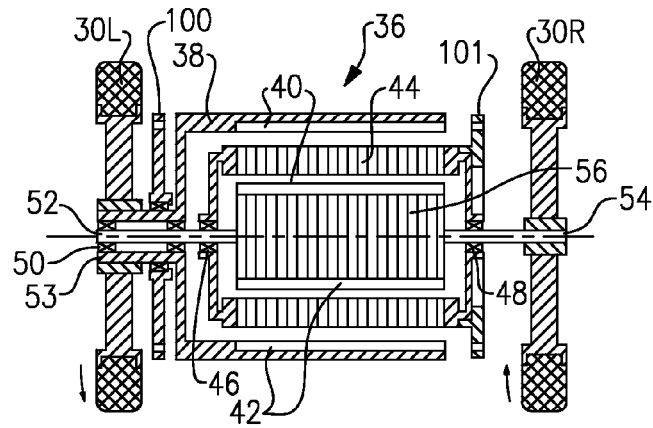
FIG. 2 shows a combined steering and drive assembly for an aircraft nose wheel.

As shown in FIG. 2, there are actually two nose wheels, with a left nose wheel 30L and a right nose wheel 30R.

A permanent magnet motor, including a stator 44 is mounted on a shaft 52/54 rotating with a rotor 56. The stator 44 is mounted on bearings 46 and 48 on the shaft 52/54, respectively. The stator 44 is supported by a static support. The shaft 54 is attached to rotate with the wheel 30R.

A second rotor 38 is shown as part of the drive and steering arrangement 36. The rotor 38 includes a shaft 53. A pair of bearings 50 supports shaft 53 on shaft 52 in a cantilever manner. The rotor 38 is fixed to rotate with the wheel 30L.

As shown, shaft 53 may also be supported by a bearing from a static support 100.

Permanent magnets 40 and 42 are associated with the rotors 56 and 38. The distinct permanent magnets 40 and 42 allow a single stator 44 and its associated coils to drive the two rotors 38 and 56 in either rotational direction, and in distinct rotational directions, as necessary, and as explained below.

The use of the stator 44 intermediate rotors 38 and 56 results in a compact and well-supported arrangement. Also, note the motor is axially intermediate the wheel 30R and 30L.

Electric power is supplied to the coils of the stator 44 from the aircraft. It may be taken from the aircraft's auxiliary power unit (APU) or on-board DC power supply via power electronics converter.

The operation of the drive and steering arrangement assembly 36 is illustrated in FIGS. 3A-D.

Figure 3A:
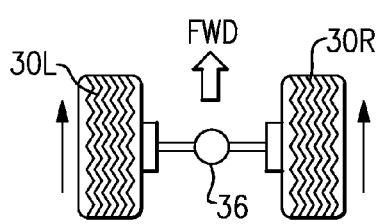
FIG. 3A shows a first drive scheme.

As shown in FIG. 3A, if both wheels 30L and 30R are driven in a forward direction, the aircraft will move forwardly.

Figure 3B:
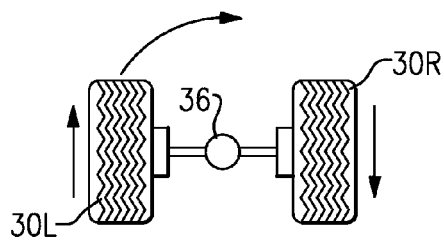
FIG. 3B shows a second drive scheme.

As shown in FIG. 3B the wheel 30L is driven forwardly while the wheel 30R is driven rearwardly. In this instance, the aircraft will turn to the right.

Figure 3C:
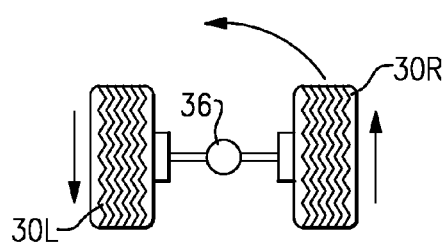
FIG. 3C shows a third drive scheme.

Conversely, as shown in FIG. 3C, the vehicle is turned to the left by driving the wheel 30R forwardly and the wheel 30L rearwardly.

Figure 3D:
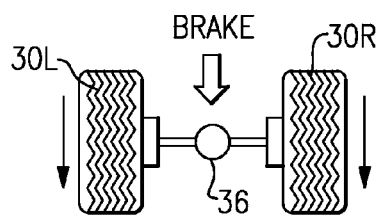
FIG. 3D shows a braking method.

In one method, as shown in FIG. 3D, if both wheels are driven rearwardly, this will act as an effective brake on the aircraft.

Tire pressure monitoring sensors can be integrated into the drive and steering arrangement 36. Such sensors can be compact lightweight Hall-effect sensors utilizing the magnetic fields already established by the permanent magnet rotors.

Figure 4:
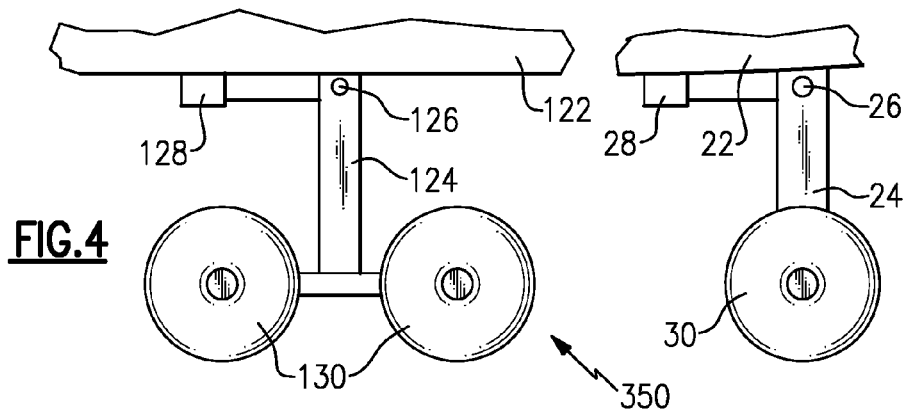
FIG. 4 shows a combined landing gear assembly.

An aircraft landing gear combination 350 is illustrated in FIG. 4. The nose wheels 30 are illustrated, and may be as shown in FIG. 1. Further details of this system are disclosed and claimed in co-pending U.S. patent application Ser. No. 13/440,192, entitled "Co-axial Contra-Rotating Motors for Differential Landing Gear Steering" filed on Apr. 5, 2012.

As shown, the combined landing gear system 350 also includes a main landing gear having main wheels 130 which pivot with a link 124 about a pivot point 126 and are driven by some actuator 128 between extended and retracted positions. The pivoting movement may be as known.

Typically, the main landing gear is associated with a wing or fuselage 122. Typically, there may be four (or more) main landing gear wheels 130 associated with each wing.

Figure 5:
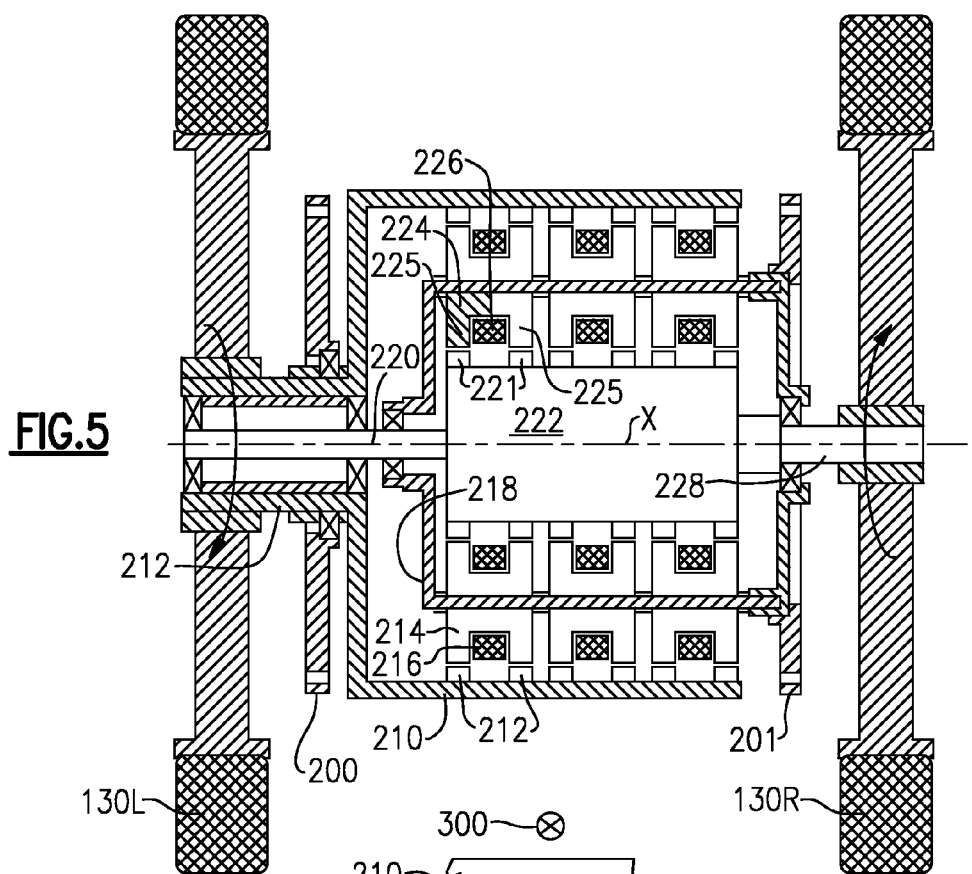
FIG. 5 is a cross-sectional view through the main landing gear wheels.

As shown in FIG. 5, each of the main wheels 130, as shown in FIG. 4, are actually a pair of main wheels 130L and 130R. There is a spaced similar set associated with the opposed wing.

In the main landing gear wheel set 130L and 130R, a transverse flux machine is utilized to drive the wheels in either a forward or rearward direction to brake the aircraft. While this arrangement could also be utilized with the nose wheels, typically it may be limited to the main landing gear wheels. While this transverse flux arrangement is capable of providing on-ground steering, it may be limited to on-ground propulsion and braking.

In the embodiment shown in FIG. 5, a first rotor 222 rotates with three sets of permanent magnets 221. The magnets 221 are spaced axially along a rotational axis X. The rotor 222 has a shaft 228 that is fixed to rotate with one wheel 130R.

A stator 218 is supported through a static structure 201 in a cantilever manner. It is also supported by a bearing on a shaft stub 220 on the opposed end of the rotor 222 from the shaft 228.

The stator 218 carries pole pieces 224 each receiving a main armature winding 226. Thus, there is a pole piece 224 having opposed ends 225 associated with each of the permanent magnets 221 in each set of the three phases illustrated in FIG. 5.

The stator 218 further has another set of pole pieces 214 including main armature windings 216. Pole pieces 214 and armature windings 216 are associated with permanent magnet sets 212 associated with a second rotor 210. As can be appreciated, there are three sets of permanent magnets 212, pole pieces 214, and armature windings 216 between the stator 218 and the second rotor 210.

The second rotor 210 rotates with a shaft 212 which is fixed to rotate with the wheel 130L.

The three sets supply three phases of AC power to each rotor.

Figure 6:
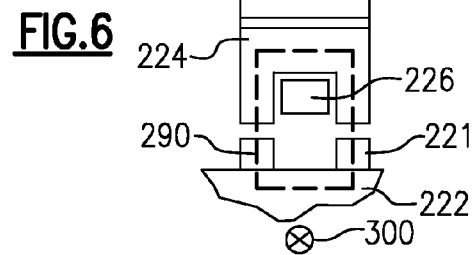
FIG. 6 shows a cross-sectional portion through one of the three phases illustrated in FIG. 5.

As shown in FIG. 6, in a transverse flux machine, main flux paths 290 and 291 passes through the pole pieces 214 and 224, and through the permanent magnet sets 212 and 221. In this manner, the rotors 222 and 210 are driven to rotate.

As shown, a flux output 300 on both rotors 210 and 222 is transverse to the rotational axis X. The transverse flux paths are plotted in FIG. 6 This is typical of a transverse flux machine.

The transverse flux machine can drive either rotor 210 or 222 in either rotational direction, either to power the aircraft, or to provide braking.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A transverse flux drive comprising:
a pair of spaced wheels;
a first rotor associated with a first of said pair of spaced wheels, and a second rotor associated with a second of said spaced wheels, one of said first and second rotors being positioned radially inwardly of the other, and said first and second rotors being rotatable about a common axis along with said first and second wheels; and
a single stator positioned radially intermediate said first and second rotors, and said single stator being operable to drive said first and second rotors to rotate about said rotational axis, with said single stator, and said first and second rotors each providing transverse flux machines; and
each of said rotors are provided with at least one set of axially spaced permanent magnets, and said stator has a pole piece and an armature winding associated with said at least one set of permanent magnets on each of said first and second rotors, such that a flux path through said pole piece and said permanent magnets is a main flux path, and an output of said transverse flux machine provides an output force which is transverse to said flux path through said pole pieces and said permanent magnet set;
wherein said first rotor drives said first of said pair of spaced wheels through a first shaft and said second rotor driving said second of said spaced wheels through a second shaft, with a bearing supporting said single stator on each of said first and second shafts.

2. The drive as set forth in claim 1, wherein there are at least three sets of said permanent magnets associated with each of said first and second rotors, three sets of pole pieces and three sets of windings on said stator and associated with each of said first and second rotors, such that there is a three-phase drive provided to said rotors.

3. The drive as set forth in claim 1, wherein said wheels are utilized as part of an aircraft landing gear.

* * * * *